(No Model.) 3 Sheets—Sheet 1.

J. R. SEVERANCE.
MOWING MACHINE.

No. 296,232. Patented Apr. 1, 1884.

WITNESSES
Wm A. Skinkle.
Alfred C. Newman.

INVENTOR.
James R. Severance,
By his Attorneys

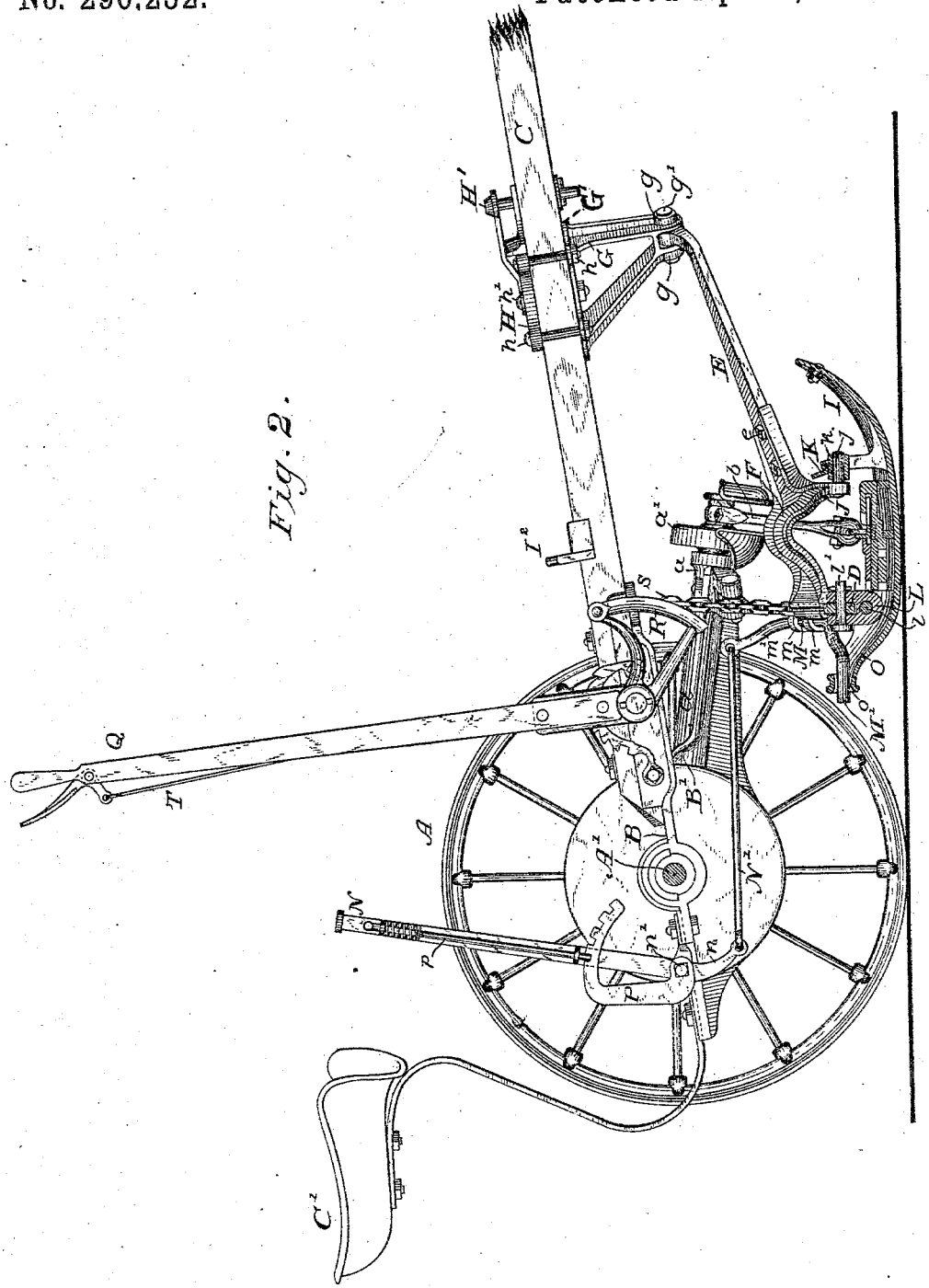

(No Model.) 3 Sheets—Sheet 3.

J. R. SEVERANCE.
MOWING MACHINE.

No. 296,232. Patented Apr. 1, 1884.

WITNESSES
Wm A. Skinkle.
Alfred C. Newman.

INVENTOR
James R. Severance.
By his Attorneys
Baldwin, Hopkins & Peyton.

UNITED STATES PATENT OFFICE.

JAMES R. SEVERANCE, OF FREMONT, OHIO.

MOWING-MACHINE.

SPECIFICATION forming part of Letters Patent No. 296,232, dated April 1, 1884.

Application filed September 1, 1883. (No model.)

*To all whom it may concern:*

Be it known that I, JAMES R. SEVERANCE, of Fremont, in the county of Sandusky and State of Ohio, have invented certain new and useful Improvements in Mowing-Machines, of which the following is a specification.

My invention relates to improvements applicable to mowing-machines of the class generally known as "two-wheeled front-cut hinged-bar machines."

My objects mainly are to provide a strong and durable jointed attachment of the cutting apparatus to the main frame and tongue of a two-wheeled hinged-bar front-cut machine; to lessen shocks and reduce strains occasioned when during the operation of the machine the cutting apparatus encounters obstacles; and to enable the driver of the machine to readily raise, lower, and rock the cutting apparatus.

In accordance with my invention, hereinafter to be fully explained, and then particularly pointed out by the claims, the jointed attachment of the cutting apparatus to the main frame of the machine is at front by a connecting-bar or coupling-arm which crosses beneath the tongue and in advance of the axle, and the jointed bracing attachment of the cutting apparatus to the tongue is by means of a drag-bar or pull-brace, the jointed connection of the coupling-arm and the drag-bar, respectively, to the frame and to the tongue being such that the pivots or axes of oscillation of the coupling-arm and drag-bar are in line or substantially in line with each other, in this way providing for the ready rise and fall of the cutting apparatus as the coupling-arm and drag-bar vibrate, without binding or cramping about their jointed attachments to the frame and tongue, respectively.

Figure 1:
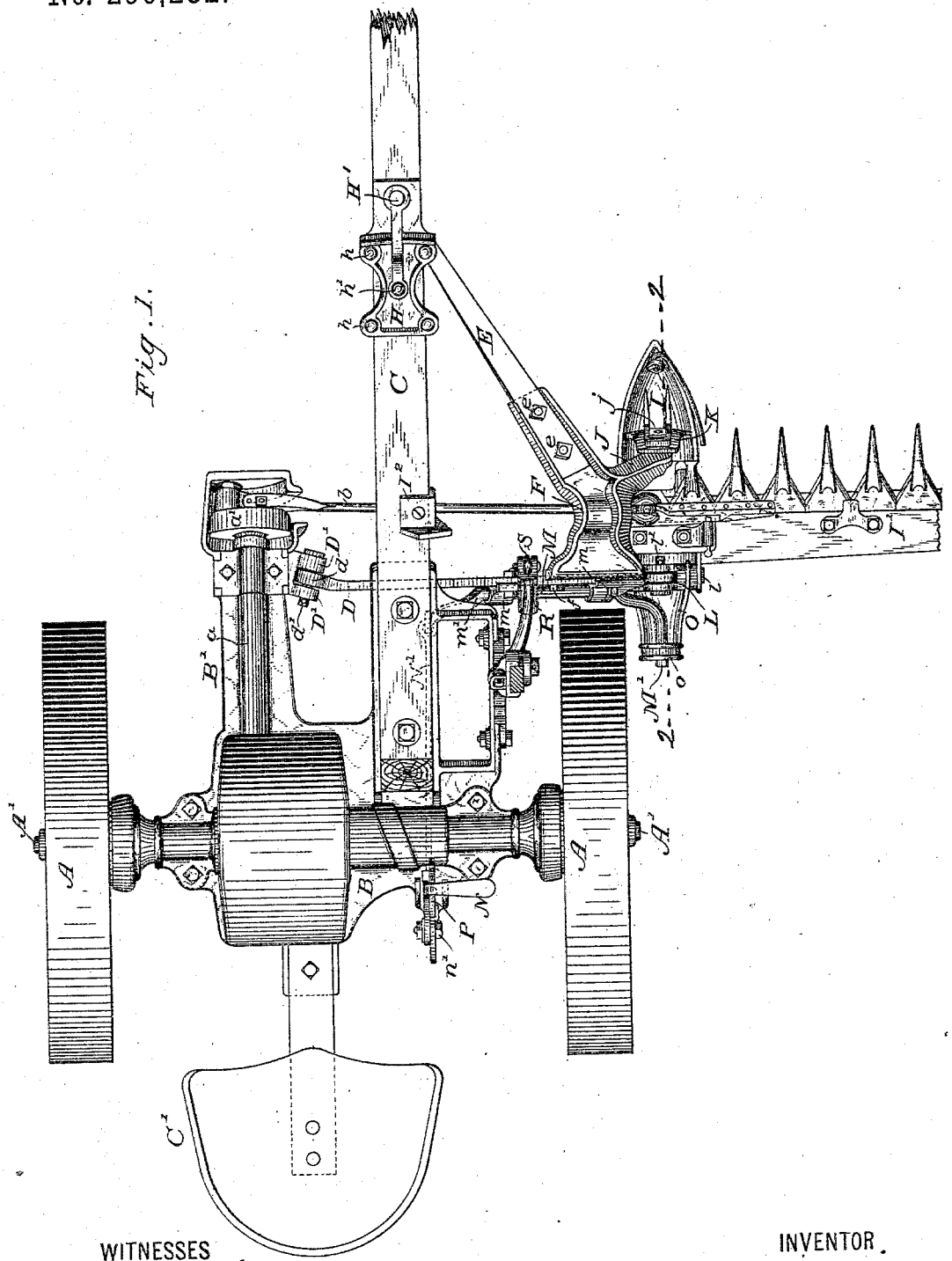
Figure 7:
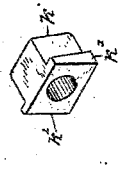
Figure 5:
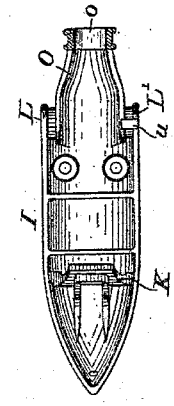
Figure 6:
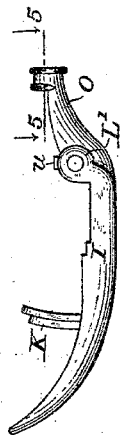
Figure 4:
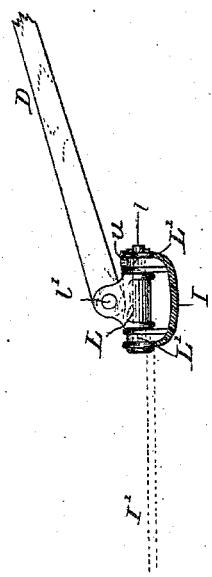
Figure 3:
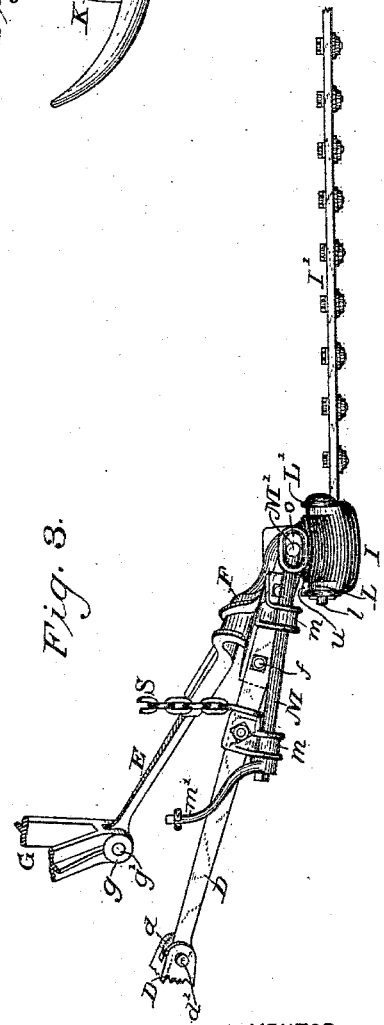

In the accompanying drawings, which show all those features of a machine which are needed in describing a suitable application of my improvements, Figure 1 is a plan view with parts broken away. Fig. 2 is a side elevation, showing parts in section on the line 2 2 of Fig. 1, and with the inner wheel removed and the axle in section. Fig. 3 is a rear elevation, showing the cutting apparatus in part, the drag-bar, the coupling-arm, the cranked rock-shaft for rocking the cutting apparatus, and some connecting parts. Fig. 4 is a view, partly in front elevation and partly in section, showing the manner of connecting the coupling-arm and the shoe. Fig. 5 is a view showing the shoe detached and in plan, except at its heel, which is in section on the line 5 5 of Fig. 6. Fig. 6 is a view in elevation of the shoe detached. Fig. 7 is a view in perspective and on an enlarged scale of the sliding bearing or socket-block by which vertically-adjustable connection is made between a guide-yoke or slotted lug on the front part of the shoe and a pivot connected with the drag-bar.

Driving and supporting wheels A A, an axle, A', a main frame, B, having forwardly-extending corner portion or arm B', a crank-shaft mounted in a bearing, $a$, of said arm, gearing for actuating the crank-shaft to drive the cutters by way of the crank-wheel $a'$ and the pitman $b$, a tongue, C, rigidly bolted to the frame, and a driver's seat, C', are provided, as usual. The machine to the extent just above described possesses no features of novelty.

A sectional coupling-frame, by which the cutting apparatus has its jointed attachment to the main frame and to the tongue, is shown as composed of three sections, consisting of a coupling-arm, D, a drag-bar, E, and a coupling-bracket, F, by which the adjacent outer ends of the coupling-arm and drag-bar are strongly and rigidly connected. The drag-bar member E of the coupling-frame has its rigid connection with the bracket F in suitable way—as by means of a seat, groove, or socket and bolts and nuts $e\ e$—and inclines forwardly, inwardly, and upwardly from its outer end. At the inner or heel end the drag-bar is bent inwardly and caused to project beneath the tongue, with which it has jointed attachment by way of a lugged hanger-bracket, G, strongly secured to the tongue. At the lower end of this downwardly-projecting tongue-bracket the drag-bar is pivotally secured by means of the perforated lugs $g\ g$ and the pivot-bolt $g'$, passing through the lugs and through the perforated bent end of the drag-bar, which is fitted loosely between the lugs. The top plate or head, G', of the hanger bracket is held against the under side of the tongue by means of corner-bolts, $h$, and their nuts, a central bolt, $h'$, passing through the tongue and its nut, and a clamp plate or casting, H, on top of the tongue. The central bolt, $h'$, serves also to secure the strap of the double-tree bolt H', as will readily be understood. Rigid connection of the coupling-arm D with the coupling-bracket F, as in this instance shown, is made by bolts $f\ f$ and their nuts, and the flanged, widened, and downwardly-projecting rear portion of the bracket. The bracket has a ledge to rest upon the coupling-arm, and beneath the ledge the bolts pass through the coupling-arm and through the bracket-flange resting against its front side. The coupling-arm D extends inwardly and upwardly from the coupling-bracket toward the frame-arm B', and at the heel end $d$ is bent forward slightly. This bent end of the coupling-arm is perforated, fitted loosely between perforated coupling-lugs D' D', which are either rigidly attached to the frame-arm in suitable way, or cast with it, and secured by a pivot, $d'$, so that the coupling-arm may vibrate vertically about its jointed connection with the main frame. The pivots $d'$ and $g'$ of the coupling-arm and drag-bar are correspondingly inclined relatively to the frame-arm and the tongue, respectively, and brought in line, or nearly so, with each other, so that the coupling-frame vibrates without cramping, the drag-bar and coupling-arm vibrating freely about their jointed attachments to tongue and frame as though about a single pivot or common center.

In lieu of the pivots-joints shown ball-and-socket or other suitable jointed connection may be made between the drag-bar and tongue-bracket, and the coupling-arm and frame-arm; but I deem the pivot-joints preferable.

The coupling-frame D E F has jointed connection with the cutting apparatus, which consists of a shoe, I, finger-beam I', cutters, &c., in such manner as to admit of the proper rising and falling and rocking movements of the cutting apparatus, and to allow it to be folded up against the tongue. When the cutting apparatus is folded up, the finger-beams thereof rest against a bracket-iron, $I^2$, on the tongue. As shown, the coupling-frame is jointed to the shoe I of the cutting apparatus in front and in rear of the finger-beam, and these front and rear jointed connections between the shoe and coupling-frame are as follows: The coupling-bracket F, which is centrally arched or curved upwardly to accommodate the pitman, is formed with a downwardly and outwardly inclined short arm or lug, J, provided at its end with a trunnion or pivot-bolt, $j$. This pivot projects forwardly and fits so as to turn freely in the perforation of a socket-block or sliding bearing $k$, which is supported in a guide-yoke or vertically-slotted lug K of the front part of the shoe. The sliding bearing is formed with a head or side flanges, $k'\ k'$, at the end next the bracket-arm J, so that while allowed to slide up and down in the shoe-yoke when the shoe is rocked about its rear-jointed connection with the coupling-frame, as in turn to be described, the displacement of the bearing is prevented. The rear jointed connection of the shoe with the coupling-frame is made by way of the outer end of the coupling-arm D, a double or two-way joint being provided. This joint consists of a doubly-lugged coupling-sleeve, L, attached to the shoe and supported so as to rock freely by a pivot, $l$, and a second pivot, $l'$, passing through the end of the coupling-arm and through the coupling-sleeve lugs, between which the coupling-arm fits loosely. The pivots $l\ l'$ are at right angles, the pivot $l'$ extending in the direction of the length of the shoe, and the pivot $l$ crossing the shoe and fitting in side bearings, L' L', thereof.

From the above description it will be seen that rocking motion of the shoe—such as to raise or lower the point—is about the pivot $l$, while the rising and falling motion is about the pivots $l'$ and $j$. The shoe is rocked by means of a rock-shaft, M, which engages the heel of the shoe, and is mounted in bearings on the coupling-frame, and a lever, N, having connection with this rock-shaft. As shown, the rock-shaft bearings are formed by downwardly and rearwardly projecting perforated lugs of brackets $m\ m$, bolted to the back of the coupling-arm D. The rearwardly-projecting bent or cranked end M' of the rock-shaft passes loosely through a slot, $o$, formed at the rear end of a heel-projection, O, of the shoe. In this way, as will readily be understood, cramping of parts is prevented when raising and lowering the cutting apparatus, regardless of the position into which the shoe may be adjusted by rocking it. A crank arm or lever, $m'$, secured to the inner end of the cramped rock-shaft M, has link-connection by a rod, N', with the lower end or short arm $n$ of the lever N. This lever is mounted on the main frame by a pivot-bolt, $n'$, and is provided with suitable detent devices to hold it in the adjusted position. As shown, the detent devices consist of a toothed segment-bracket or curved rock-arm, P, secured to the frame, and an endwise-moving spring-actuated rod supported in guide-lugs on the lever for engaging the rock-arm. As will readily be seen, forward movement of the lever serves to elevate the point of the shoe and a rearward movement to depress it.

A lever, Q, having a segment-sheave, R, and pivotally supported on the main frame in suitable way, and a chain, S, connecting the sheave and the coupling-arm D, enable the driver to raise and lower the cutting apparatus. Suitable detent devices—such as the rack $t$, and the spring-actuated rod T for engaging the rack—serve to hold the lever as adjusted.

In order that the cutting apparatus may be raised at its outer end, and bodily, after first raising the shoe and heel end of the finger-beam slightly, to stiffen the finger-beam, as is well understood, the shoe is provided with a stop-lug or short stud, $u$, at the inner bearing, L', for the pivot $l$, and this stop, shortly after the commencement of the upward movement of the shoe, comes against the coupling-arm, thus causing any further upward movement of the shoe to be imparted to the cutting apparatus throughout its entire length.

By the employment of the forwardly-extending brace or drag-bar for connecting the cutting apparatus with the tongue, instead of the more customary push-bar or thrust-brace jointed connection of the cutting apparatus to the main frame or axle of the machine, it will be seen that the cutting apparatus in passing ordinarily-encountered obstructions swings backwardly at the same, thus readily riding over the obstructions, lessening strains and reducing draft of the machine as compared with one provided with a thrust-bar brace, which necessitates a forward movement of the cutting apparatus at the time it moves upward to pass over obstructions. It will further be obvious that less labor is required by the driver to lift the cutting apparatus, which, in ascending, moves backward, than to lift cutting apparatus, which requires at the same time to be thrust forward over the ground and through or into standing grass.

I am aware that it is not new, broadly considered, to make drag-bar jointed connection between the hinged cutting apparatus and the tongue of a front-cut mowing-machine, and so I do not unqualifiedly claim a machine of such construction. Neither do I wish to be understood as confining my invention strictly to the precise construction and particular arrangement of parts which I have in detail described and shown.

I claim as of my own invention—

1. The combination of the main frame, its arm, the tongue, the cutting apparatus, the drag-bar having jointed connection at its outer end with the cutting apparatus, the hanger-bracket secured to the tongue, and to which the inner end of the drag-bar is jointed, the coupling-arm having jointed connection at its outer end with the cutting apparatus, and the joint connecting the inner end of the coupling-arm with the main-frame arm, and by which the coupling-arm is caused to vibrate about an axis in line with that about which the drag-bar vibrates, substantially as and for the purpose hereinbefore set forth.

2. The combination, substantially as hereinbefore set forth, of the main frame, the tongue, the coupling-frame, the shoe, the double joint by which the shoe has connection at the rear with the coupling-frame, and the joint by which the shoe has vertically-adjustable connection at front with the coupling-frame, for the purpose described.

3. The combination, substantially as hereinbefore set forth, of the main frame, the tongue, the coupling-frame, the shoe, the double joint by which the shoe has connection at rear with the coupling-frame, the joint by which the shoe has vertically-adjustable connection at front with the coupling-frame, and the rock-shaft engaging the heel of the shoe, for the purpose described.

4. The combination of the coupling-frame, the shoe, the double joint by which the shoe has connection at rear with the coupling-frame, and the vertically-sliding bearing and pivot by which the coupling-frame is connected with the guide-yoke of the shoe at front, substantially as and for the purpose hereinbefore set forth.

5. The shoe provided with a front guide-yoke and the rear pivot-bearings, substantially as and for the purpose hereinbefore set forth.

6. The shoe having the heel projection, provided with the slot, substantially as and for the purpose hereinbefore set forth.

7. The combination, substantially as hereinbefore set forth, of the main frame, the tongue, the coupling-frame jointed to the main frame and tongue, the shoe having doubly-jointed connection at rear with the coupling-frame, and vertically-adjustable jointed connection at front therewith, the lifting-lever having connection with the coupling-frame, the rock-shaft acting upon the heel of the shoe, and the lever connected with the rock-shaft, for the purpose described.

8. The combination of the hinged shoe, having the slotted heel-projection, the coupling-arm, and the rock-shaft mounted in bearings on the coupling-arm, and provided with the cranked end passing through the slot in the shoe-heel, substantially as and for the purpose hereinbefore set forth.

In testimony whereof I have hereunto subscribed my name this 29th day of August, A. D. 1883.

JAMES R. SEVERANCE.

Witnesses:
R. P. BUCKLAND,
H. S. BUCKLAND.